(12) United States Patent
Jeong et al.

(10) Patent No.: US 11,144,300 B2
(45) Date of Patent: Oct. 12, 2021

(54) UPDATE CONTROL APPARATUS AND METHOD FOR A VEHICLE CONTROLLER AND A VEHICLE HAVING SAME

(71) Applicants: HYUNDAI MOTOR COMPANY, Seoul (KR); KIA MOTORS CORPORATION, Seoul (KR)

(72) Inventors: Heok Sang Jeong, Suncheon-si (KR); Dong Jin Shin, Suwonsi (KR); Myeong Gyu Jeong, Seoul (KR); Dong Youl Lee, Seoul (KR); Young Su Kim, Seongnam-si (KR); Jae Am Seo, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/559,240

(22) Filed: Sep. 3, 2019

(65) Prior Publication Data
US 2020/0192655 A1 Jun. 18, 2020

(30) Foreign Application Priority Data
Dec. 12, 2018 (KR) .......................... 10-2018-0159720

(51) Int. Cl.
*G06F 8/65* (2018.01)
*G07C 5/00* (2006.01)
(Continued)

(52) U.S. Cl.
CPC .................. *G06F 8/65* (2013.01); *G06F 8/71* (2013.01); *G07C 5/008* (2013.01); *G07C 5/0816* (2013.01)

(58) Field of Classification Search
CPC .. G06F 8/65; G06F 8/71; G07C 5/008; G07C 5/0816
See application file for complete search history.

(56) References Cited

U.S. PATENT DOCUMENTS

| | | | |
|---|---|---|---|
| 7,756,621 B2 * | 7/2010 | Pillar .................. | B60W 50/029 701/41 |
| 2007/0100513 A1 * | 5/2007 | Asano ...................... | G06F 8/65 701/2 |

(Continued)

FOREIGN PATENT DOCUMENTS

| | | | | |
|---|---|---|---|---|
| KR | 20130014885 A | * | 2/2013 | |
| KR | 20170114148 A | * | 10/2017 | ........ B60W 30/1886 |
| WO | WO-2019030897 A1 | * | 2/2019 | ............. G06F 9/442 |

OTHER PUBLICATIONS

Wang et al., "Combined state of charge estimator for electric vehicle battery pack", 2007, Elsevier Ltd. (Year: 2007).*

(Continued)

*Primary Examiner* — Wei Y Zhen
*Assistant Examiner* — Junchun Wu
(74) *Attorney, Agent, or Firm* — Lempia Summerfield Katz LLC

(57) ABSTRACT

An update control apparatus for a vehicle controller includes a state information collecting device that collects vehicle state information when an update event of a vehicle controller occurs, a battery control device that determines an update-based ultimate target State of Charge (SOC) based on the collected vehicle state information and controls charge or discharge of a battery based on the determined ultimate target SOC, and a control device that downloads update data of the vehicle controller from an update server and updates the vehicle controller.

19 Claims, 10 Drawing Sheets

(51) Int. Cl.
*G07C 5/08* (2006.01)
*G06F 8/71* (2018.01)

(56) References Cited

U.S. PATENT DOCUMENTS

| | | | | |
|---|---|---|---|---|
| 2009/0001992 | A1* | 1/2009 | Tsuchiya | G01R 31/367 324/426 |
| 2012/0078553 | A1* | 3/2012 | Kuroda | B60L 53/63 702/63 |
| 2014/0156128 | A1* | 6/2014 | Wake | B60L 1/003 701/22 |
| 2016/0075177 | A1* | 3/2016 | Biderman | H04M 1/72412 301/6.5 |
| 2016/0114786 | A1* | 4/2016 | Morisaki | B60K 6/445 701/22 |
| 2016/0236586 | A1* | 8/2016 | Soo | B60L 58/13 |
| 2018/0178668 | A1* | 6/2018 | Ichikawa | B60W 20/12 |
| 2018/0241229 | A1* | 8/2018 | Kitaoka | B60L 53/63 |
| 2018/0312158 | A1* | 11/2018 | Morimoto | B60W 20/12 |
| 2019/0176802 | A1* | 6/2019 | Kim | B60W 20/40 |
| 2019/0212997 | A1* | 7/2019 | Sangameswaran | B60L 58/13 |
| 2019/0347877 | A1* | 11/2019 | Garrett | G07C 5/008 |
| 2020/0122584 | A1* | 4/2020 | Zhang | B60L 1/00 |
| 2020/0294401 | A1* | 9/2020 | Kerecsen | G05D 1/0287 |

OTHER PUBLICATIONS

Manzie et al., "State of Charge Management for Plug-In Hybrid Vehicles With Uncertain Trip Information", Sep. 2015, ASME (Year: 2015).*

Lee et al., "State-of-charge Stream Processing for Electric Vehicles", 2014, Advanced Science and Technology Letters (Year: 2014).*

Xie et al., "The Estimation of State of Charge for Power Battery Packs used in Hybrid Electric Vehicle", 2017, Elsevier Ltd. (Year: 2017).*

* cited by examiner

UPDATE CONTROL APPARATUS AND METHOD FOR A VEHICLE CONTROLLER AND A VEHICLE HAVING SAME

CROSS-REFERENCE TO RELATED APPLICATION

This application claims the benefit of priority to Korean Patent Application No. 10-2018-0159720, filed in the Korean Intellectual Property Office on Dec. 12, 2018, the entire contents of which are incorporated herein by reference.

TECHNICAL FIELD

The present disclosure relates to an update control apparatus and method for a vehicle controller and a vehicle system.

BACKGROUND

Generally, an update operation of a vehicle controller is performed by using an electric load when ignition of an engine is turned off.

An electric load is a power source that provides a driving force for ignition of the engine of a vehicle. The electric load needs to have a certain level of electric energy to ensure ignition performance.

However, when the update of the vehicle controller is performed when the ignition of the engine is turned off, the ignition performance of the vehicle may not be ensured due to consumption of electric energy by the electric load. Also, when a small amount of electric energy remains in the electric load, the update operation of the controller may not be completed.

SUMMARY

The present disclosure has been made to solve the above-mentioned problems occurring in the prior art while advantages achieved by the prior art are maintained intact.

An aspect of the present disclosure provides an update control apparatus and method for a vehicle controller and a vehicle system which adjust a target State of Charge (SOC) of a battery necessary to perform an update of a vehicle controller when the vehicle is being driven to control the charge or discharge of the battery. Therefore, ignition performance of the vehicle is ensured even after update of the vehicle controller while maintaining fuel efficiency at the time of download of the update data.

The technical problems to be solved by the present inventive concept are not limited to the aforementioned problems. Any other technical problems not mentioned herein will be clearly understood from the following description by those having ordinary skill in the art to which the present disclosure pertains.

According to an aspect of the present disclosure, an update control apparatus for a vehicle controller may include a state information collecting device that collects vehicle state information when an update event of the vehicle controller occurs. The update control apparatus further includes a battery control device that determines an update-based ultimate target SOC based on the collected vehicle state information and controls charge or discharge of a battery based on the determined ultimate target SOC. The update control apparatus also includes a control device that downloads update data of the vehicle controller from an update server and updates the vehicle controller.

The vehicle state information may include at least one of a SOC information of the battery, a navigation setting information, or an estimated driving time information.

The battery control device may determine an increase amount in a target SOC based on a smaller value of a value obtained by subtracting a current SOC from a fully-charged state and a request SOC at the time of update of the vehicle controller.

The battery control device may determine the request SOC based on at least one of a load current consumption, a battery capacity, an amount of update data, a roll back data, or a data transmission speed.

The battery control device may determine the ultimate target SOC by applying the increase amount in the target SOC based on whether a destination of navigation is set and whether a previous update is approved.

The battery control device may determine the ultimate target SOC based on a value obtained by adding the increase amount in the target SOC to a generation control-based target SOC when the destination setting information does not exist and the previous update for the vehicle controller is approved.

The battery control device may determine the ultimate target SOC by applying the increase amount in the target SOC, a driving time point, and an estimated driving time to a generation control-based target SOC when the destination setting information exists and the previous update for the vehicle controller is approved.

The battery control device may determine the ultimate target SOC by applying the increase amount in the target SOC and a number of driving cycles after rejection of approval of the previous update to a generation control-based target SOC when the approval of the previous update for the vehicle controller is rejected.

The control device may determine whether the update event occurs by identifying software version information of the vehicle controller from the update server.

The control device may output a message inquiring whether to download update data at time of occurrence of the update event.

The battery control device may adjust a target SOC of the vehicle to the determined ultimate target SOC when the approval of download of the update data is completed.

The control device may output a message inquiring whether to approve update of the vehicle controller at time when ignition of the vehicle is turned off.

The control device may update the vehicle controller when approval of the update of the vehicle controller is completed, and switch an operation mode of the vehicle to a sleep mode when the approval of the update of the vehicle controller is rejected.

According to an aspect of the present disclosure, an update control method for a vehicle controller may include collecting vehicle state information when an update event of the vehicle controller occurs, determining an update-based ultimate target State Of Charge (SOC) based on the collected vehicle state information and controlling charge or discharge of a battery based on the determined ultimate target SOC, downloading update data of the vehicle controller, and updating the vehicle controller.

According to an aspect of the present disclosure a vehicle system may include an update server that provides update data of a vehicle controller. The vehicle system may further include an update control apparatus that determines an update-based ultimate target State Of Charge (SOC) based on vehicle state information when an update event of the vehicle controller occurs, controls charge or discharge of a battery based on the determined ultimate target SOC, downloads update data of the vehicle controller from the update server, and updates the vehicle controller.

According to an aspect of the present disclosure an update control apparatus for a vehicle controller includes a processor and a non-transitory memory coupled to the processor. The update control apparatus further includes a computer executable code stored in the non-transitory memory and executable by the processor to cause the processor to collect vehicle state information when an update event of the vehicle controller occurs, determine an update-based ultimate target SOC based on the collected vehicle state information and control charge or discharge of a battery based on the determined ultimate target SOC, and download update data of the vehicle controller from an update server and update the vehicle controller.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
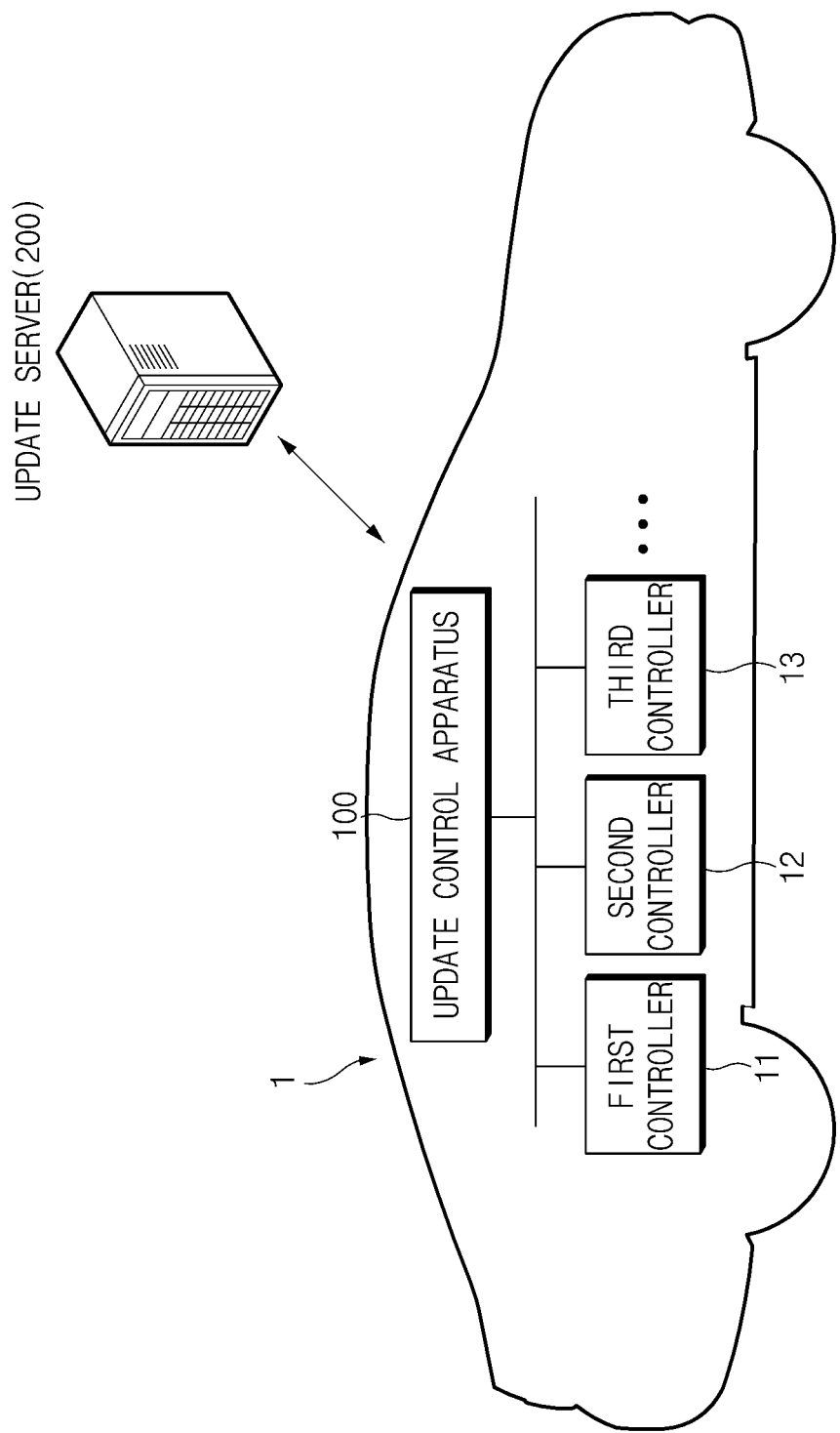
FIG. 1 illustrates a vehicle system to which an update control apparatus of a vehicle controller according to an embodiment of the present disclosure is applied.

Hereinafter, various embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates a vehicle system to which an update control apparatus of a vehicle controller according to an embodiment of the present disclosure is applied.

Referring to FIG. 1, a vehicle system may include an update control apparatus 100 (hereinafter referred to as an "update control apparatus") of a vehicle controller and an update server 200.

The update server 200 may store and manage update data of in-vehicle controllers 11, 12, and 13 (hereinafter controllers 11-13) in a vehicle 1 and provide the update data of the controllers 11-13 according to a request from the update control apparatus 100.

The update control apparatus 100 may perform wireless communication with the update server 200 and determine whether an update event for the in-vehicle controllers 11-13 occurs. When an update event for at least one of the in-vehicle controllers 11-13 occurs, the update control apparatus 100 may determine an update-based ultimate target State of Charge (SOC) based on vehicle state information and secure energy necessary for the update by controlling charge or discharge of a battery based on the ultimate target SOC.

In this case, the update control apparatus 100 may download the update data for the in-vehicle controllers 11-13 from the update server 200 while controlling charge or discharge of the battery based on the ultimate target SOC. When ignition of the vehicle 1 is turned off, the update control apparatus 100 may update a corresponding controller using the downloaded update data.

According to the update control apparatus 100 of the present disclosure, the charge or discharge is controlled by adjusting the target SOC of the battery for executing the update of the in-vehicle controllers 11-13 of the vehicle 1 while being driven, thereby sufficiently securing energy at the time of data download and update. Therefore, ignition performance of the vehicle 1 is maintained even after updating the controllers 11-13 while maintaining the fuel efficiency at the time of data download.

The update control apparatus 100 according to the present disclosure may be implemented in the vehicle 1. In this case, the update control apparatus 100 may be formed integrally with internal control units of the vehicle 1 and may be implemented as a separate device and connected to the control units of the vehicle 1 through separate coupling means. A detailed configuration of the update control apparatus 100 is given with reference to an embodiment of FIG. 2.

Figure 2:
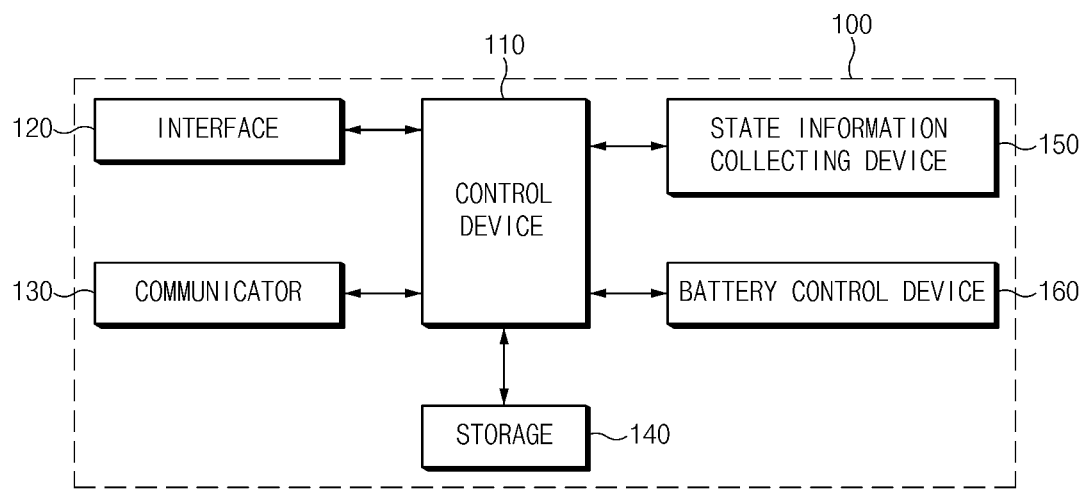
FIG. 2 illustrates a configuration of an update control apparatus of a vehicle controller according to an embodiment of the present disclosure.

FIG. 2 illustrates a configuration of an update control apparatus of a vehicle controller according to an embodiment of the present disclosure.

Referring to FIG. 2, the update control apparatus 100 may include a control device 110, an interface 120, a communicator 130, storage 140, a state information collecting device 150, and a battery control device 160. In the present disclosure, the control device 110, the state information collecting device 150, and the battery control device 160 of the update control apparatus 100 according to the embodiment may be implemented as at least one processor.

The interface 120 may include an input device that receives a control command from a user and an output device that outputs the operational status, results, or the like of the update control apparatus 100.

The input device may include a key button, and may also include a mouse, a joystick, a jog shuttle, a stylus pen, and the like. In addition, the input device may also include a soft key implemented on a display.

The output device may include a display and may also include an audio output device, such as a speaker. As an example, the output device may display, on the display, a message asking a user to approve the update of the vehicle controller and/or approve the download of the update data. In addition, the output device may display, on the display, an operational status at the time of downloading the update data of the vehicle controller and/or updating the vehicle controller.

In this case, when a touch sensor such as a touch film, a touch sheet, or a touch pad is provided in the display, the display may operate as a touch screen, and may be implemented in a form in which the input device and the output device are integrated.

The display may include at least one of a liquid crystal display (LCD), a thin film transistor liquid crystal display (TFT LCD), an organic light-emitting diode (OLED) display, a flexible display, a field emission display (FED), or a three-dimensional display (3D display).

The communicator 130 may include a communication module that supports communication interfaces with electronic components and/or controllers provided in the vehicle.

As one example, the communication module may receive version information of controller software from the controllers provided in the vehicle and transmit update data to the controllers. Also, the communication module may receive state information of the battery from a battery management system (BSM). In addition, the communication module may receive destination setting information, estimated arrival time information, or the like from a navigation device.

In the disclosure, the communication module may include a module supporting vehicle network communication such as CAN (Controller Area Network) communication, LIN (Local Interconnect Network) communication, and Flex-Ray communication.

In addition, the communicator 130 may include a communication module for wireless Internet connection or a communication module for short range communication.

As an example, the communication module may be connected to the update server 200 in a wireless communication manner and receive update information of the controllers. Also, the communication module may download the update data of each of the controllers through wireless communication with the update server 200.

In the disclosure, the wireless Internet technology may include wireless LAN (MILAN), wireless broadband (WI-BRO), Wi-Fi, World Interoperability for Microwave Access (WIMAX), and the like.

The short range communication technology may include Bluetooth, ZigBee, Ultra Wideband (UWB), Radio Frequency Identification (RFID), Infrared Data Association (IrDA), and the like.

The storage 140 may store, for example, data and/or algorithm necessary for the update control apparatus 100 to operate.

As an example, the storage 140 may store information of the in-vehicle controllers. Also, the storage 140 may store vehicle state information received through the communicator 130.

The storage 140 may store condition information, instructions and/or algorithms for determining an ultimate target SOC according to the vehicle state information. Also, the storage 140 may store instructions and/or algorithms for updating each controller.

In the disclosure, the storage 140 may include storage medium, such as a random access memory (RAM), a static random access memory (SRAM), a read only memory (ROM), a programmable read-only memory (PROM), an electrically erasable programmable read-only memory (EEPROM), or the like.

The control device 110 may process signals transferred between components of the update control apparatus 100 during the download of the update data of the vehicle controller or the update of the vehicle controller.

The control device 110 may determine whether an update event occurs by identifying software version information of the vehicle controller through the update server 200. When it is determined that an update event for the controllers occurs, the control device 110 may request the state information collecting device 150 to collect vehicle state information.

When the update event for the controllers occurs, the state information collecting device 150 may collect vehicle state information in response to the request from the control device 110. In the disclosure, the vehicle state information may include at least one of SOC information of the battery, navigation setting information, or estimated driving time information.

The state information collecting device 150 may collect the vehicle state information from the controllers connected through the communicator 130 or collect the vehicle state information from sensors.

The state information collecting device 150 may transfer the collected vehicle state information to the control device 110. The control device 110 may transfer the vehicle state information to the battery control device 160 and request the battery control device 160 to control charge or discharge of the battery according to the vehicle state.

The battery control device 160 may determine an update-based ultimate target SOC based on the vehicle state information in response to the request from the control device 110 and control charge or discharge of the battery based on the determined ultimate target SOC.

First, the battery control device 160 may determine an increase amount in the target SOC based on the vehicle state. In this case, the battery control device 160 may determine an increase amount in the target SOC based on a smallest value of a value obtained by subtracting a current SOC from a fully-charged state (e.g., 100%) and a request SOC at the time of update of the controller. In the disclosure, the request SOC may mean a SOC requested for update of the controller.

As an example, the battery control device 160 may calculate the request SOC by applying a load current consumption, a battery capacity, and an update residual time to the following Equation 1.

$$\text{Request } SOC = \frac{\text{load current consumption} \times \text{update residual time} \times 100}{\text{battery capacity}} \quad \text{[Equation 1]}$$

In Equation 1, the update residual time is the sum of a remaining update time and a rollback time, and the update residual time may be derived from Equation 2.

$$\text{update residual time} = \frac{\text{updated data amount}}{\text{data transmission speed}} + \frac{\text{rollback data amount}}{\text{data transmission speed}} \quad \text{[Equation 2]}$$

When the increase amount in the target SOC is determined, the battery control device 160 may determine the ultimate target SOC by applying the previously-determined increase amount in the target SOC to a generation control-based target SOC.

In this case, the battery control device 160 may determine the ultimate target SOC differently depending on whether a destination of navigation is set or whether a previous update is approved.

As an example, the battery control device 160 may calculate a first target SOC by adding the previously-determined increase amount in the target SOC to the generation control-based target SOC. In this case, when no destination setting information exists and the previous update for the controller is approved, the battery control device 160 may determine the first target SOC as the ultimate target SOC. An embodiment for calculating the first target SOC may refer to Equation 3.

$$SOC_{target(1)} = SOC_{target\_generation\ control} + \text{Increase amount in } SOC_{target} \quad \text{[Equation 3]}$$

Figure 3A:
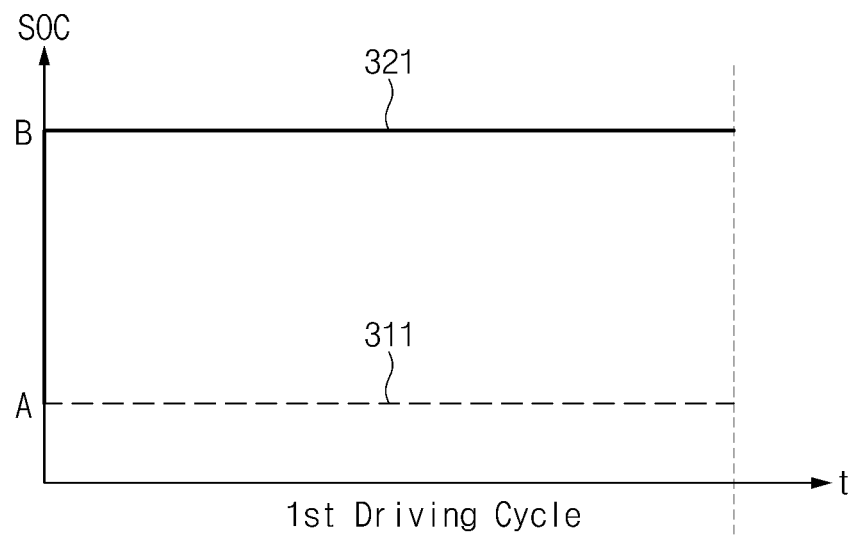
FIGS. 3A-3C, 4, and 5A-5D illustrate an embodiment describing the operation of an update control apparatus of a vehicle controller according to an embodiment of the present disclosure.

When the ultimate target SOC is adjusted to the first target SOC, a change in the SOC during a single driving cycle may be represented as in FIG. 3A. Referring to FIG. 3A, the generation control-based target SOC during a single driving cycle is A % as shown in the graph indicated by reference numeral 311 while, when an update event for the controller occurs, the ultimate target SOC during the single driving cycle may be B % because the generation control-based target SOC A % increases by the increase amount in the target SOC, as indicated by reference numeral 321.

Also, the battery control device 160 may adjust the increase amount in the target SOC according to a driving time point and an estimated driving time and calculate a second target SOC based on a value obtained by adding the adjusted increase amount in the target SOC to the generation control-based target SOC. In this case, when destination setting information exists and the previous update for the controller is approved, the battery control device 160 may determine the second target SOC as the ultimate target SOC. An embodiment for calculating the second target SOC may refer to Equation 4.

$$SOC_{target(2)} = SOC_{target\_generation\ control} + \text{Increase amount in } SOC_{target} \times \left\{ \frac{\text{Driving time point}}{\text{Estimated driving time}} \right\} \quad \text{[Equation 4]}$$

Figure 3B:
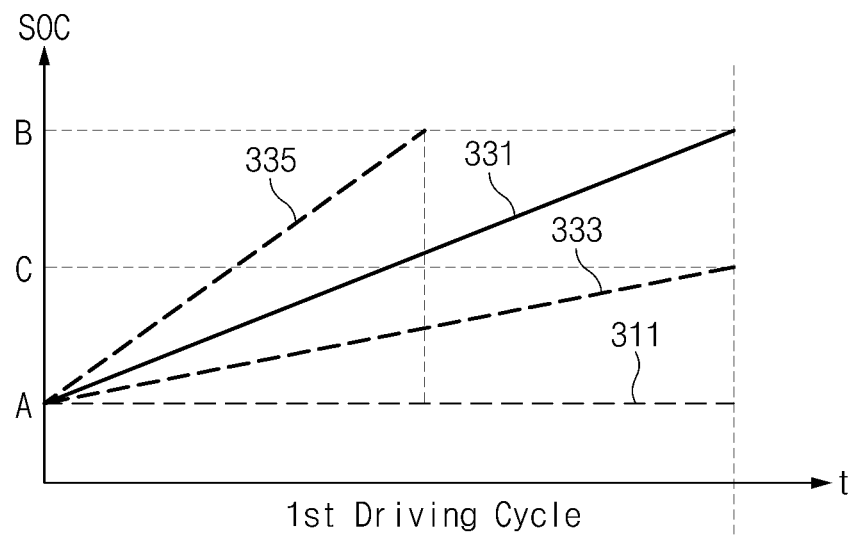

When the ultimate target SOC is adjusted to the second target SOC, a change in the SOC during a single driving cycle may be represented as in FIG. 3B. Referring to FIG. 3B, the generation control-based target SOC during a single driving cycle is A % as shown in the graph indicated by reference numeral 311. When an update event for the controller occurs, the ultimate target SOC during the single driving cycle may gradually increase from the generation control-based target SOC A % according to the driving time point and the estimated driving time as indicated by the reference numeral 331. In this case, when the amount of data to be updated is small, the maximum SOC may decrease from B % to C % as indicated by the reference numeral 333. Also, when the estimated driving time is short, the SOC rapidly increases and a time taken to reach the maximum SOC B % may be shorten as indicated by the reference numeral 335.

Also, the battery control device 160 may adjust the increase amount in the target SOC according to the number of driving cycles and the number of control steps for return of the SOC, and calculate a third target SOC based on a value obtained by adding the adjusted increase amount in the target SOC to the generation control-based target SOC. In this case, when approval of the previous update for the vehicle controller is rejected, the battery control device 160 may determine the third target SOC as the ultimate target SOC. In this case, the third target SOC may gradually decrease as the number of driving cycles (DC_counter) increases. An embodiment for calculating the third target SOC may refer to Equation 5.

$$SOC_{target(3)} = SOC_{target\_generation\ control} + \text{Increase amount in } SOC_{target} \times \left\{ 1 - \frac{DC_{Count}}{STEP_{Num}} \right\} \quad \text{[Equation 5]}$$

Figure 3C:
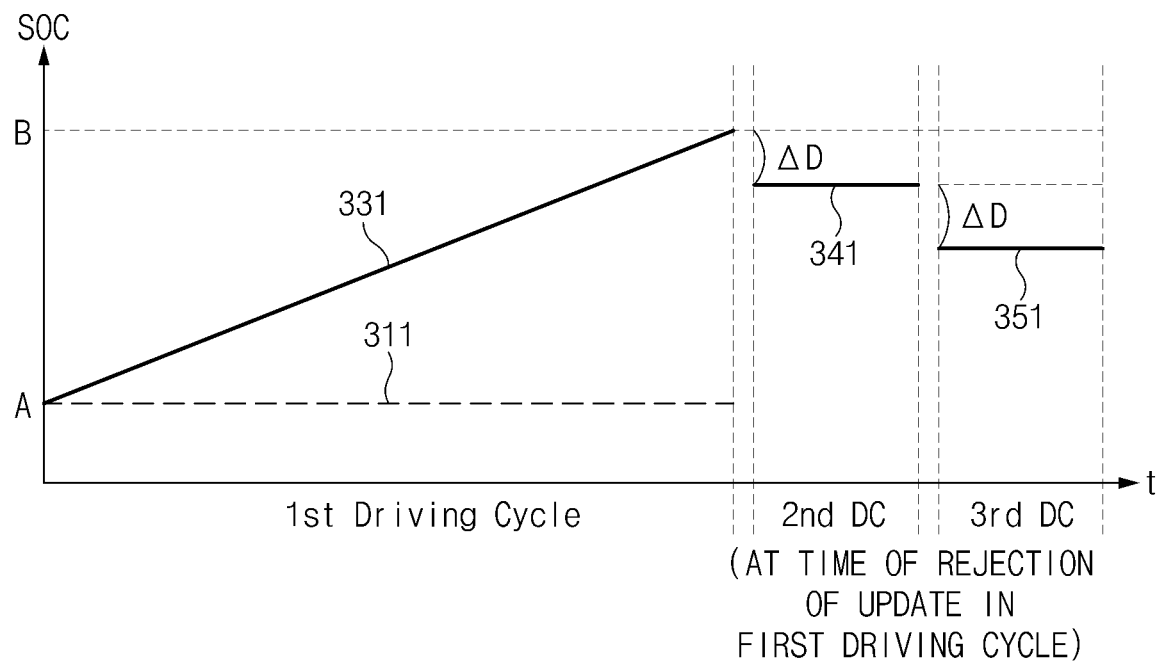

When the approval of the previous update is rejected, the battery control device 160 may determine that there is no intention to update, and may gradually decrease the SOC, which had increased previously to improve fuel efficiency. When the approval of the update is rejected, the change in the SOC in the next driving cycle may be represented as shown in FIG. 3C. Referring to FIG. 3C, when the target SOC is adjusted from the reference numeral 311 to the reference numeral 331 for download of the update data in the previous cycle, the ultimate SOC becomes B %.

Therefore, the SOC becomes B % at the time when a second driving cycle is started. When the approval of the previous update is rejected, the SOC, which has increased to B %, may gradually decrease by D % for each cycle as indicated by the reference numerals 341 and 351.

Figure 5A:
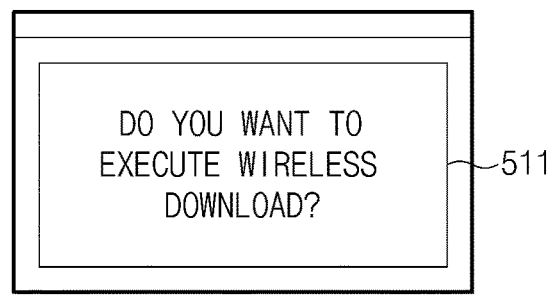

The control device 110 may output, to the display, a message to inquire whether to approve download of the update data when an update event occurs. In this case, an embodiment for the message output to the display may refer to FIG. 5A. A user may select whether to approve or reject download through a message 511 displayed on the display.

When approval of the download of the update data is completed, the battery control device 160 may determine the ultimate target SOC by adjusting the target SOC of the vehicle to one of the first target SOC, the second target SOC and the third target SOC according to whether a destination of navigation is set and whether approval of the previous update is completed.

In this case, when the ultimate target SOC is determined, the battery control device 160 may control charge or discharge of the battery based on the determined ultimate target SOC.

On the other hand, the battery control device 160 may maintain a previously-set target SOC when the update event does not occur or the approval of download is rejected by the user.

Figure 5B:
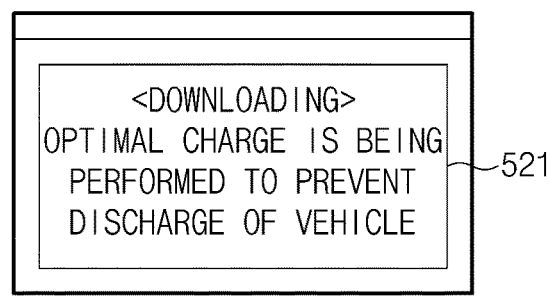

The control device 110 may download the update data of the vehicle controller from the update server 200 while the charge or discharge of the battery is being controlled by the battery control device 160. In this case, the control device 110 may output, to the display, a message notifying that the battery is being charged according to the adjusted target SOC as well as notifying a download status of data. In this case, an embodiment for the message output to the display may refer to FIG. 5B. Therefore, the user may identify a download status and a charge status through a message 521 in FIG. 5B.

Figure 5C:
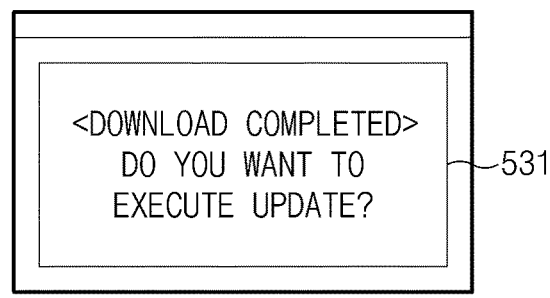

When the ignition of the vehicle is turned off, the control device 110 may determine whether downloaded update data exists. When the downloaded update data exists, the control device 110 may output a message to inquire whether to update a corresponding controller to the display. In this case, an embodiment for the message output to the display may refer to FIG. 5C.

Figure 5D:
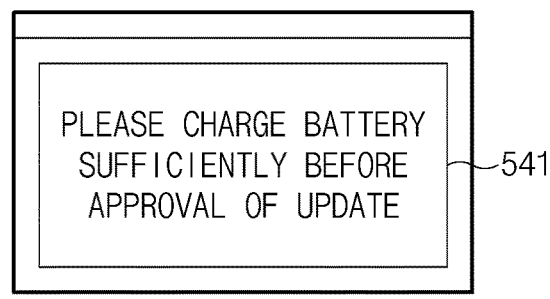

A user may select whether to approve (execute) or reject update of the corresponding controller through a message 531 displayed on the display. When the approval of update is rejected by the user, the control device 110 may further output a guidance message 541 as in FIG. 5D.

When the update of the corresponding controller is approved, the control device 110 may command execution of update while transmitting the downloaded update data to the corresponding controller. Therefore, the corresponding controller may update software of the controller according to the command of the control device 110.

The apparatus 100 according to the present embodiment that operates in the manner described above may be implemented in the form of an independent hardware device including a memory and a processor for processing each operation and may be implemented in the form included in other hardware devices such as a microprocessor or general purpose computer system.

Figure 4:
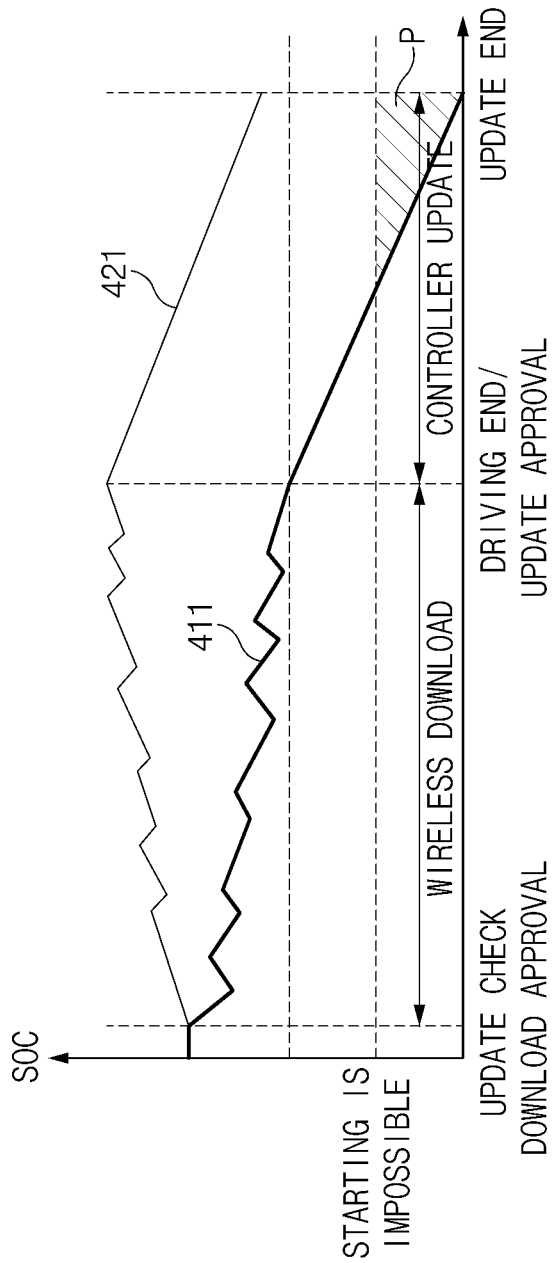

FIG. 4 illustrates a change in a SOC at the time of download and update when an ultimate target SOC is adjusted upward according to a vehicle state.

Referring to FIG. 4, when the target SOC is set to the generation control-based SOC as indicated by the reference numeral 411, charged energy may be used while update data is being downloaded and the controller may be updated using the remaining energy even in the state where the ignition of the vehicle is turned off. In this case, energy charged in an electric load does not remain as much as the minimum energy for ignition during the update of the controller like a region P, and the vehicle may not be started.

The update control apparatus 100 of the vehicle controller of the present disclosure may adjust the target SOC upward according to the vehicle state or the amount of data at the time of downloading the update data of the controller. Therefore, the minimum energy for the ignition remains the same even after the update as indicated by the reference numeral 421. Thereby, ignition performance of the vehicle is ensured after the update of the vehicle controller while fuel efficiency is maintained at the time of download.

A flowchart of operation of the apparatus according to the present disclosure as configured above is described below in detail.

Figure 6:
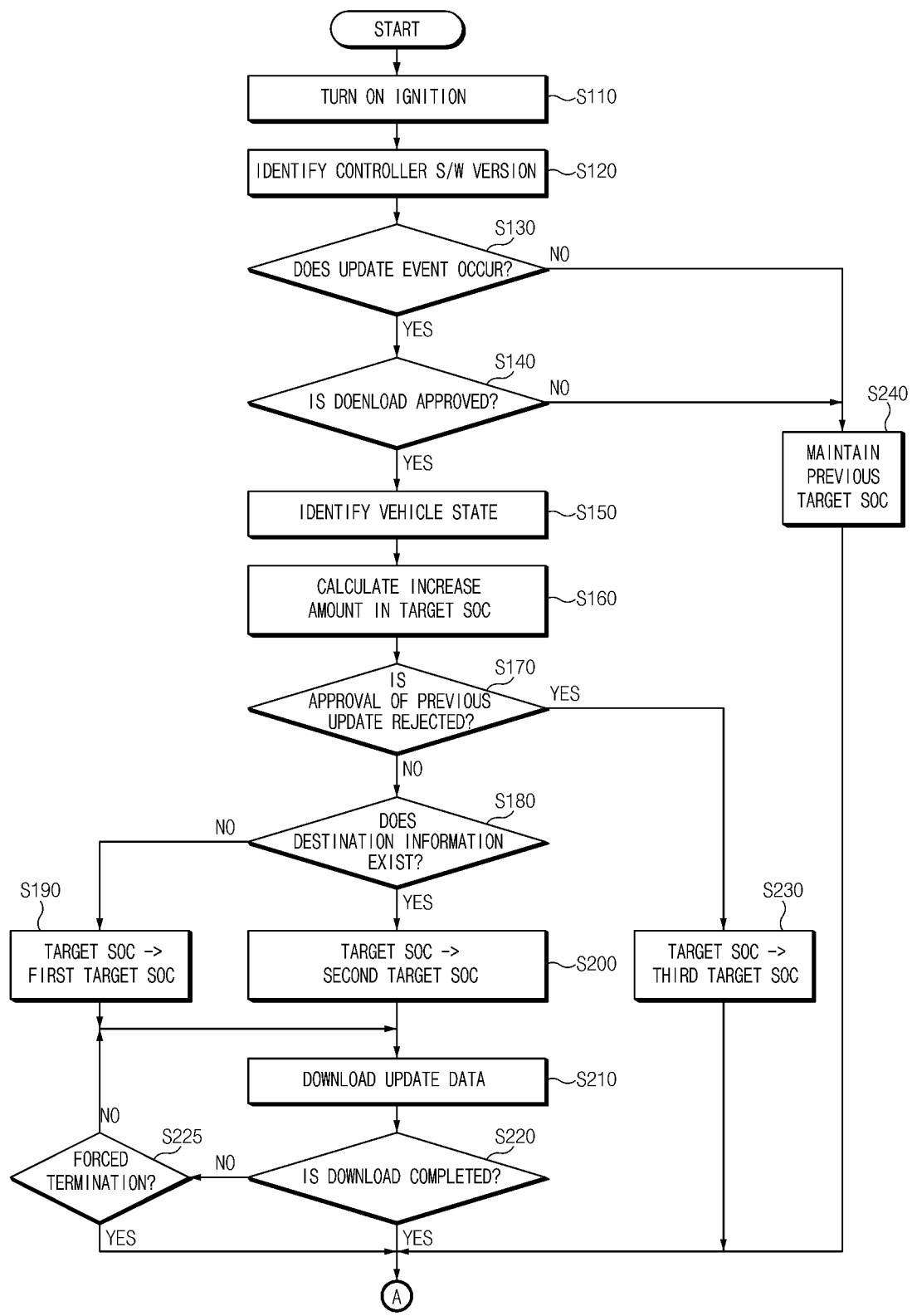
FIGS. 6 and 7 illustrate flowcharts of an update control method of a vehicle controller according to an embodiment of the present disclosure.
Figure 7:
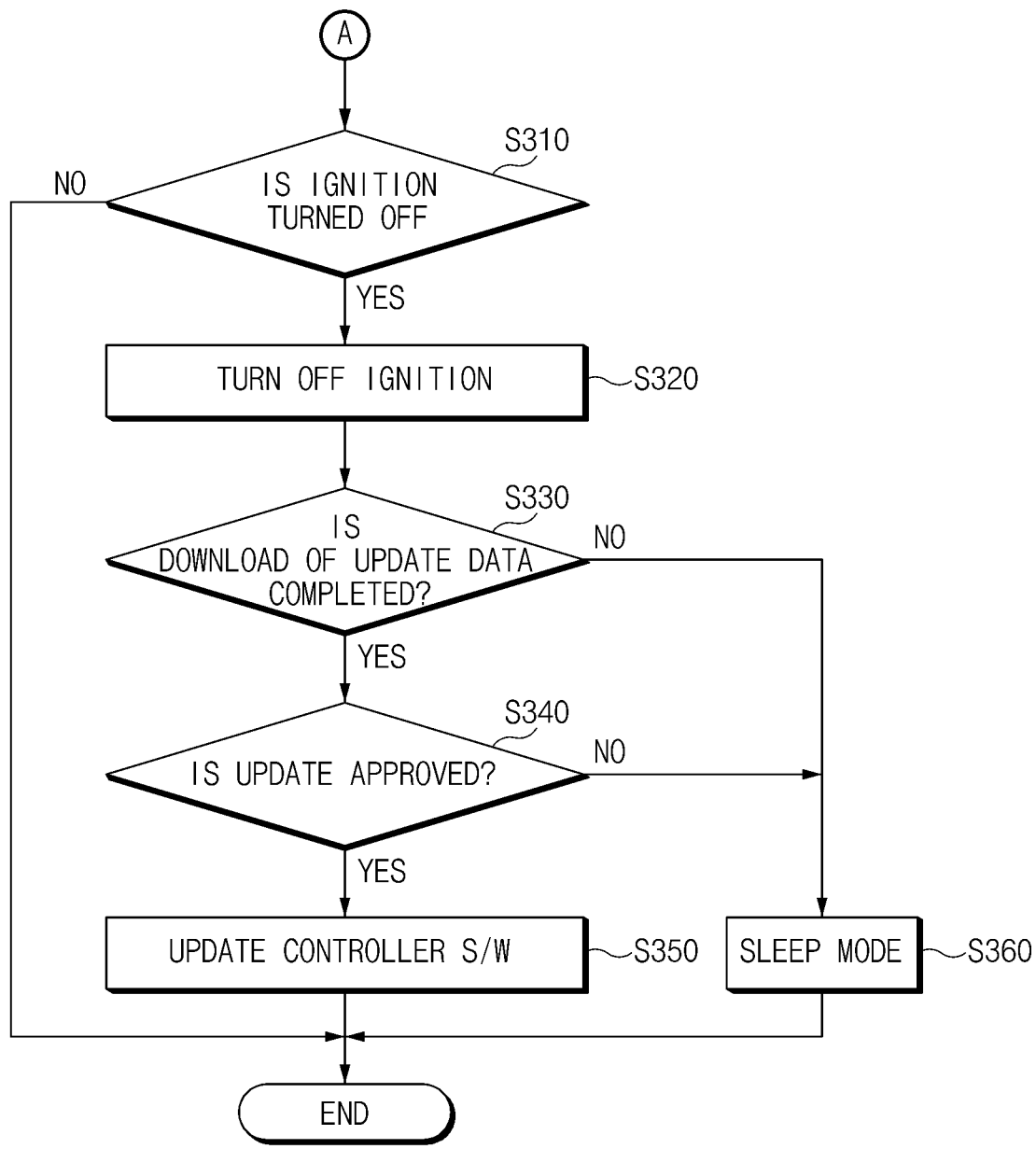

FIGS. 6 and 7 illustrate flowcharts of an update control method for a vehicle controller according to an embodiment of the present disclosure. In the disclosure, FIG. 6 illustrates a flowchart that illustrate the operation of downloading update data of a vehicle controller. FIG. 7 illustrates a flowchart that illustrate the operation of updating a controller after ignition of a vehicle is turned off.

Referring to FIGS. 6 and 7, when ignition of the vehicle is turned on (S110), the update control apparatus may identify software (S/W) version information of an in-vehicle controller from the update server (S120) and determine whether an update event occurs (S130).

When it is determined that the update event does not occur in S130, the update control apparatus may operate the vehicle while maintaining a previous target SOC (S240). When it is determined that the update event occurs in S130, the update control apparatus may determine whether download is approved by a user (S140).

When approval of the download is rejected by the user in step S140, the update control apparatus may operate the vehicle while maintaining the previous target SOC (S240).

When approval of the download is completed by the user in step S140, the update control apparatus may identify a state of the vehicle by collecting vehicle state information (S150), and calculate an increase amount in a target SOC based on the vehicle state (S160). Specific embodiments of calculating an increase amount in the target SOC may refer to [Equation 1] and [Equation 2].

Subsequently, the update control apparatus may determine whether approval is rejected at the time of the previous update for a corresponding controller (S170). When it is determined that the approval is rejected at the time of the previous update for the corresponding controller in step S170, the update control apparatus may adjust a target SOC to the third target SOC and suspend relevant operation.

When it is determined that the approval is not rejected at the time of the previous update for the corresponding controller in step S170, the update control apparatus may adjust the target SOC to the first target SOC or the second target SOC. In this case, the update control apparatus may adjust the target SOC to the first target SOC (S180 and S190) when destination information does not exist, and adjust the target SOC to the second target SOC when the destination information exists (S180 and S200).

Specific embodiments of calculating first to third target SOCs may refer to [Equation 3] to [Equation 5].

When the ultimate target SOC is adjusted in step S190 or S200, the update control apparatus may start the download of update data (S210). When the download is completed (S220), the update control apparatus may finish operation related to the download of the update data.

On the other hand, when there is a request for forced termination of downloading when the downloading is not completed (S225), the update control apparatus may finish the operation related to the downloading of the update data.

Thereafter, when there is a request to switch to a state in which ignition of the vehicle is turned off (S310), the update control apparatus may turn off the start of the vehicle (S320).

When the ignition of the vehicle is turned off, the update control apparatus may determine whether the downloaded update data exists through steps in FIG. 6 (S330). When the downloaded update data exists as a result of determination of S330, the update control apparatus may inquire whether to approve update of the corresponding controller with respect to a user and determine whether approval is completed (S340).

In this case, when approval of the update is permitted by the user, the update control apparatus may update the controller software (S/W) of a corresponding controller (S350), switch a vehicle mode to a sleep mode when the user rejects the approval (S360), and finish update-related operation.

Figure 8:
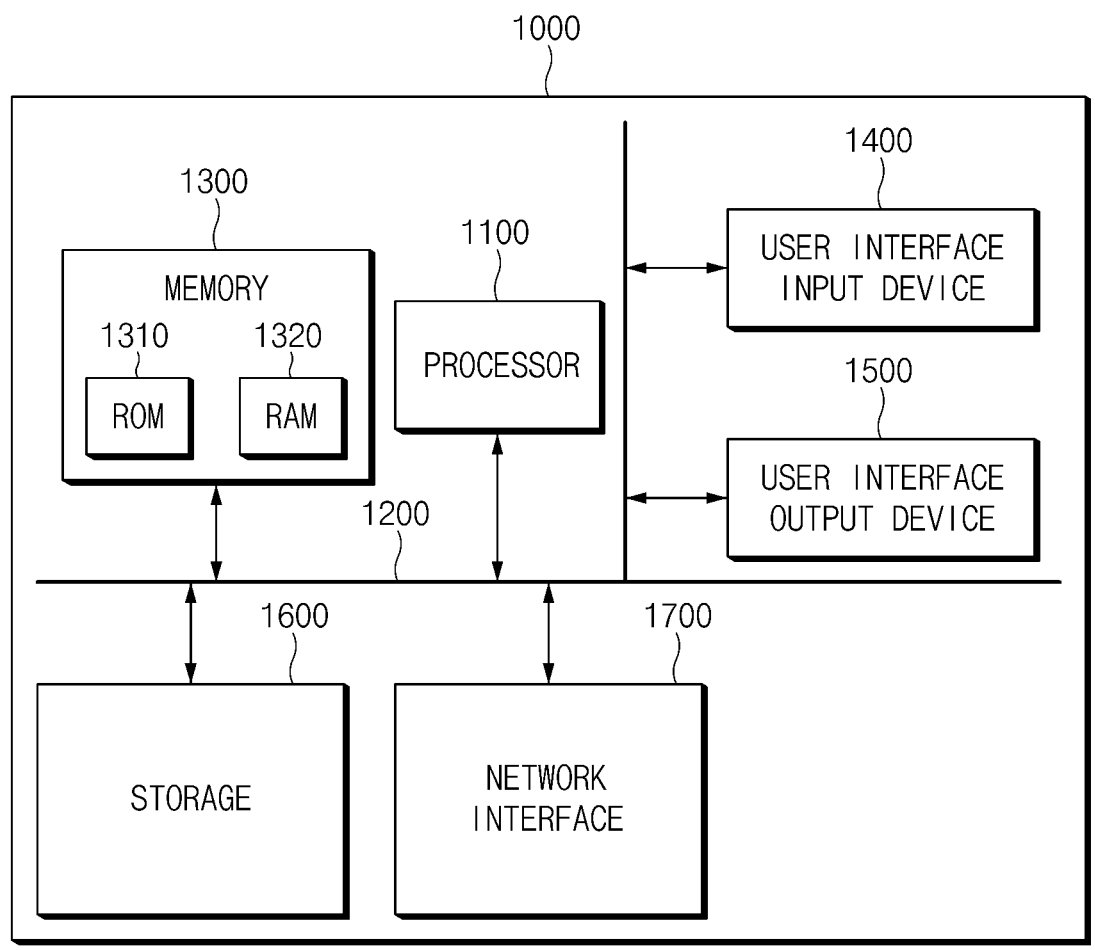
FIG. 8 illustrates a computing system in which a method according to an embodiment of the present disclosure is executed.

FIG. 8 illustrates a computing system in which a method according to an embodiment of the present disclosure is executed.

Referring to FIG. 8, a computing system 1000 may include at least one processor 1100, a memory 1300, a user interface input device 1400, a user interface output device 1500, storage 1600, or a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module or a computer executable code executed by the processor 1100, or in a combination thereof. The software module may reside on a storage medium (that is, the memory 1300 and/or the storage 1600) such as a RAM memory, a flash memory, a ROM memory, an EPROM memory, an EEPROM memory, a register, a hard disk, a removable disk, and a CD-ROM. The storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to the present disclosure, the charge or discharge of a battery is controlled by adjusting the target SOC of the battery to execute the update of the vehicle controller while driving, thereby the fuel efficiency is maintained at the time of data download and the ignition performance of the vehicle is ensured even after updating the vehicle controller.

Hereinabove, although the present disclosure has been described with reference to various embodiments and the accompanying drawings, the present disclosure is not limited thereto, but may be variously modified and altered by those having ordinal)/skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An update control apparatus for a vehicle controller, comprising:
a state information collecting device comprising a first processor configured to collect vehicle state information when an update event of the vehicle controller occurs;
a battery control device comprising a second processor configured to determine an update-based ultimate target State of Charge (SOC) based on the collected vehicle state information and control charge or discharge of a battery based on the determined ultimate target SOC; and
a control device comprising a third processor configured to download update data of the vehicle controller from an update server and update the vehicle controller when the update of the vehicle controller is approved,
wherein the second processor of the battery control device determines the ultimate target SOC by applying an increase amount of a target SOC according to whether a destination of navigation is set and whether the update of the vehicle controller is approved, and
wherein the second processor of the battery control device determines the ultimate target SOC based on a value obtained by adding the increase amount in the target SOC to a generation control-based target SOC when the destination of navigation setting information does not exist and the update of the vehicle controller is approved.

2. The update control apparatus of claim 1, wherein the vehicle state information includes at least one of SOC information of the battery, navigation setting information, or estimated driving time information.

3. The update control apparatus of claim 1, wherein the second processor of the battery control device determines an increase amount in a target SOC based on a smaller value of a value obtained by subtracting a current SOC from a fully-charged state and a request SOC at a time of update of the vehicle controller.

4. The update control apparatus of claim 3, wherein the second processor of the battery control device determines the request SOC based on at least one of a load current consumption, a battery capacity, an amount of update data, a roll back data, or a data transmission speed.

5. The update control apparatus of claim 1, wherein the second processor of the battery control device determines the ultimate target SOC by applying the increase amount in the target SOC, a driving time point, and an estimated driving time to a generation control-based target SOC when the destination setting information exists and the update of the vehicle controller is approved.

6. The update control apparatus of claim 1, wherein the second processor of the battery control device determines the ultimate target SOC by applying the increase amount in the target SOC and a number of driving cycles after rejection of approval of the update of the vehicle controller to a generation control-based target SOC when the approval of the update of the vehicle controller is rejected.

7. The update control apparatus of claim 1, wherein the third processor of the control device determines whether the update event occurs by identifying software version information of the vehicle controller from the update server.

8. The update control apparatus of claim 7, wherein the third processor of the control device outputs a message inquiring whether to download the update data at the time of occurrence of the update event.

9. The update control apparatus of claim 8, wherein the second processor of the battery control device adjusts the target SOC of the vehicle to the determined ultimate target SOC when the approval of download of the update data is completed.

10. The update control apparatus of claim 1, wherein the third processor of the control device outputs a message inquiring whether the update of the vehicle controller is approved at a time when ignition of the vehicle is turned off.

11. The update control apparatus of claim 10, wherein the third processor of the control device updates the vehicle controller when approval of the update of the vehicle controller is completed, and switches an operation mode of the vehicle to a sleep mode when the approval of the update of the vehicle controller is rejected.

12. An update control method for a vehicle controller, comprising:
- collecting vehicle state information when an update event of the vehicle controller occurs;
- determining an update-based ultimate target State of Charge (SOC) based on the collected vehicle state information and controlling charge or discharge of a battery based on the determined ultimate target SOC;
- downloading update data of the vehicle controller; and
- updating the vehicle controller when the update of the vehicle controller is approved,
- wherein the controlling of the charge or discharge of the battery includes determining the ultimate target SOC by applying an increase amount in a target SOC according to whether a destination of navigation is set and whether the update of the vehicle controller is approved, and
- determining the ultimate target SOC based on a value obtained by adding the increase amount in the target SOC to a generation control-based target SOC when the destination of navigation setting information does not exist and the update of the vehicle controller is approved.

13. The update control method of claim 12, wherein the controlling of the charge or discharge of the battery includes:
- determining the increase amount of the target SOC based on a smallest value of a value obtained by subtracting a current SOC from a fully-charged state and a request SOC at time of update of the vehicle controller.

14. The update control method of claim 12, further comprising:
- determining whether the update event occurs by identifying software version information of the vehicle controller from an update server.

15. The update control method of claim 12, wherein the controlling of the charge or discharge of the battery includes inquiring whether to approve download of the update data when the update event occurs and adjusting a target SOC of the vehicle to the determined ultimate target SOC when approval of the download of the update data is completed.

16. The update control method of claim 12, wherein the updating of the vehicle controller includes inquiring whether to approve the update of the vehicle controller when ignition of the vehicle is turned off and updating the vehicle controller when approval of the update of the vehicle controller is completed.

17. The update control method of claim 16, further comprising:
- switching an operation mode of the vehicle to a sleep mode when the approval of the update of the vehicle controller is rejected.

18. A vehicle system comprising:
- an update server comprising a first processor configured to provide update data of a vehicle controller; and
- an update control apparatus comprising a second processor configured to determine an update-based ultimate target State of Charge (SOC) based on vehicle state information when an update event of the vehicle controller occurs, control charge or discharge of a battery based on the determined ultimate target SOC, download update data of the vehicle controller from the update server, and update the vehicle controller when the update of the vehicle controller is approved,
- wherein the second processor of the update control apparatus determines the ultimate target SOC by applying an increase amount of a target SOC according to whether a destination of navigation is set and whether the update of the vehicle controller is approved, and
- wherein the second processor of the update control apparatus determines the ultimate target SOC based on a value obtained by adding the increase amount in the target SOC to a generation control-based target SOC when the destination of navigation setting information does not exist and the update of the vehicle controller is approved.

19. An update control apparatus for a vehicle controller, the update control apparatus comprising:
- a processor;
- a non-transitory memory coupled to the processor; and
- a computer executable code stored in the non-transitory memory and executable by the processor to cause the update control apparatus to:
  - collect vehicle state information when an update event of the vehicle controller occurs;
  - determine an update-based ultimate target State of Charge (SOC) based on the collected vehicle state information and control charge or discharge of a battery based on the determined ultimate target SOC; and
  - download update data of the vehicle controller from an update server and update the vehicle controller when the update of the vehicle controller is approved,
- wherein the ultimate target SOC is determined by applying an increase amount of a target SOC according to whether a destination of navigation is set and whether the update of the vehicle controller is approved, and
- wherein the ultimate target SOC is determined based on a value obtained by adding the increase amount in the target SOC to a generation control-based target SOC when the destination of navigation setting information does not exist and the update of the vehicle controller is approved.

* * * * *